United States Patent Office 2,995,458
Patented Aug. 8, 1961

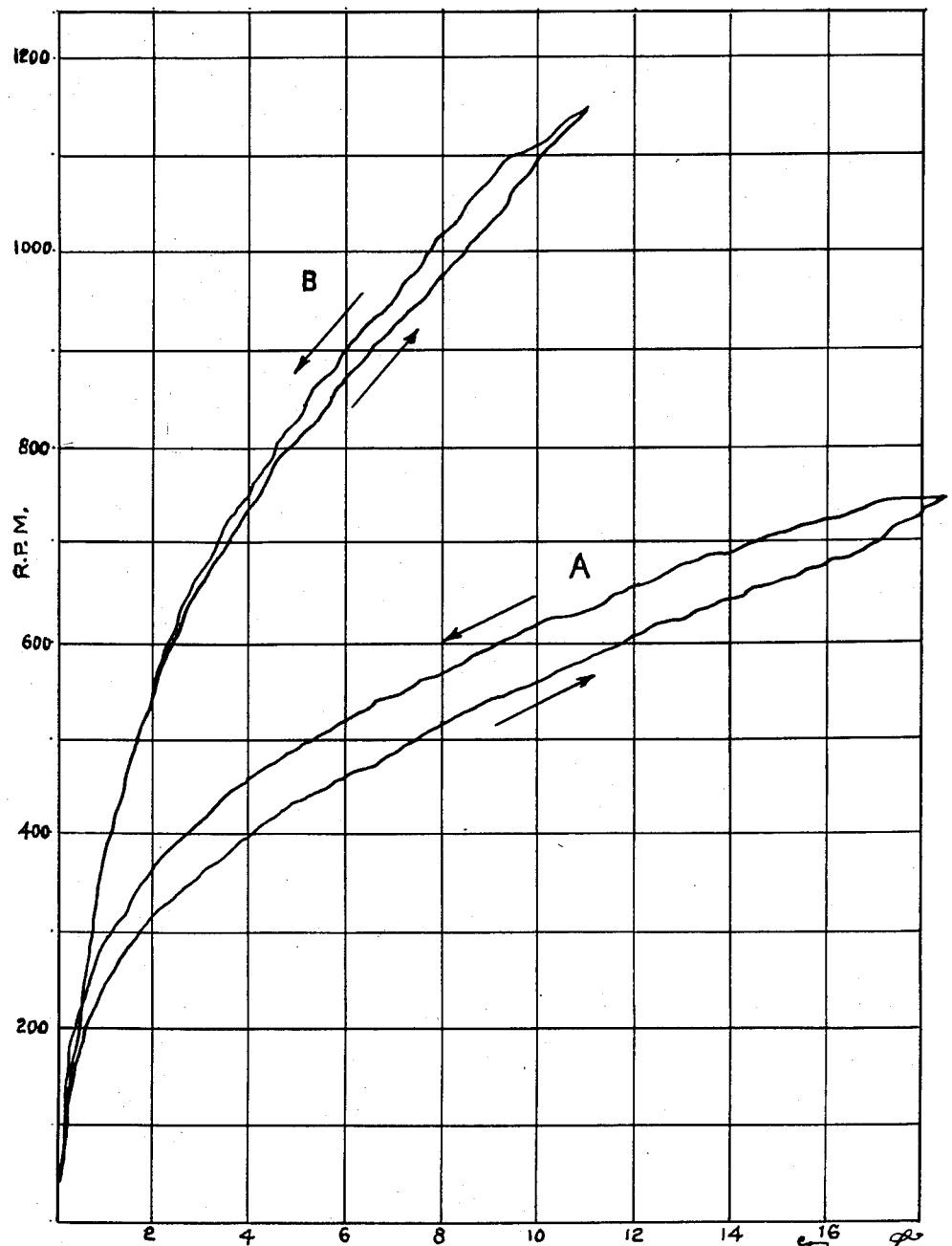

2,995,458
REDUCING DILATANCY OF CLAYS
Haydn H. Murray, Berkeley Heights, N.J., assignor to Georgia Kaolin Company, Elizabeth, N.J., a corporation of New Jersey
Filed May 22, 1959, Ser. No. 815,094
5 Claims. (Cl. 106—288)

This invention relates to the treatment of clay slurries, specifically those containing kaolin, to improve their rheological properties by reduction of dilatant effects. Kaolin, which is used in large quantities in finely divided form by the paper industry as a pigment for coating paper, is the object of the said treatment. Kaolin is a mineral composed mainly of hydrated aluminum silicate. It occurs in nature, both, in the form of primary deposits, i.e., deposits formed in place, and secondary deposits, which are bodies of kaolin that have been transported and deposited from place to place. These deposits contain particles with variations in size distribution, and often admixed with other mineral impurities.

In the early 1930's, it was found that the smaller particles of kaolin, specifically those below 2 microns in equivalent spherical diameter are the ones which impart highest gloss and brightness to a paper coating. This discovery is the subject of Maloney Patent No. 2,158,987, issued May 16, 1939. Since then, it has been found that the particles below 2 microns in equivalent spherical diameter are essentially plate-like in character, whereas those particles coarser than 2 microns in equivalent spherical diameter are essentially stack-like aggregates of these platey particles, cemented together.

The kaolin clay material is generally received at the paper mill in dry form. It is then "madedown" into slurry form and pumped from place to place in the mill. In recent years, the tendency in the paper industry has been to slurry the clay or coating colors at high solids density, say, above 50% and sometimes as high as 72% solids. When the clay is madedown at these high solids concentrations, certain important rheological characteristics become apparent. One of the more important characteristics is dilatancy. Dilatancy is the property by which viscosity increases with increasing shear rate. Dilatancy characteristics are dependent mainly on particle size distribution, particle shape, and the nature of the surface and surface charge on the kaolin particle. Under shear conditions and with high solid content slurries, and as the percentage of dispersed clay is increased in the slurry, a critical point is reached whereas the apparent viscosity rises very rapidly.

The purpose of this invention is to improve the dilatant effects of clays by the addition thereto of a small but critical amount of a lithium hydroxide.

Extremely dilatant kaolin slurries cannot be handled by pumps or other equipment with very close tolerances because of the high shear developed. Therefore, the problem of dilatant clay slurries has become more and more critical, since paper mills have found it increasingly necessary to handle clay slurries at higher solids content. Also, because paper coating machines are continually operating at much higher rates of speed, creating much more shear at the point where the coating is applied, this condition has tended to emphasize further the importance of limiting the dilatant character of the kaolin clay coating color or slurry.

It is well-known by those skilled in the art that slurries consisting of coarse particles of kaolin generally develop dilatancy at a lower percent solids content than slurries composed of fine particles of kaolin. Most clays that are slurried at high solids content and are used on coating machines, have particle size distributions that are dominantly below 2 microns. The coarser coating clays contain particles that are approximately 80% finer than 2 microns, while the higher grade coating clays contain higher percentages of particles measuring below the 2 micron limit. Clay received at the paper mill is either in a flocculated or a predispersed condition. Most operations require that the clay be dispersed before use in order to obtain a high percent solids content, such dispersions having a minimum viscosity for easy handling. It thus becomes apparent that dilatancy of the dispersed kaolin slurry at high solids concentration is of utmost practical importance, because it is a limiting factor as to the percent solids in the slurries to be handled, for extremely dilatant systems cannot be pumped in high speed equipment with close clearances. Due to the fact that dilatancy characteristics may become undesirably pronounced at 70 to 72% solids, it is apparent that a reduction of such characteristics is of extreme importance to users of kaolin clays.

An instrument that can be used to detect dilatant characteristics of a clay slurry is the Hercules high-shear viscometer. It is a rotational instrument which automatically provides a continuous plot of torque versus rate of shear, over a rate of shear range of 0 to 4540 reciprocal seconds. Another instrument which will provide comparable data and provide higher rates of shear is the Hagan viscometer.

According to the present invention, dilatancy of clay slurries is reduced significantly and the flow characteristics of such slurries is made more Newtonian in character by addition thereto of small amounts of lithium hydroxide. Other hydroxides, such as those of aluminum, magnesium and calcium are nowhere near as effective. Sodium and barium hydroxide have limited effectiveness on some clays, but not on others, whereas lithium hydroxide has been found to reduce considerably the dilatant properties not only of kaolin clays, but also of montmorillonite and other clays. Salts, such as the carbonates, chlorides and nitrates of the aforesaid elements have been tried for this purpose and they also were found inadequately effective. Furthermore, they exhibited detrimental properties.

The amount of lithium hydroxide employed for optimum effectiveness is about 0.05% to 0.1% and up to about 0.2% by weight of the dry clay, depending upon the clay properties, such as particle size distribution, particle shape, surface charge, and the like. The lithium hydroxide should be added to the clay in a liquid medium because, if the hydroxide were added as a dry powder, there would be a tendency to form small, hard agglomerates in the slurry, which are sometimes called "pinheads." One advantage that lithium hydroxide has over other materials tried is that it does not change significantly the low-shear or "Brookfield" viscosity characteristics of the slurry, whereas most of the other materials tried increase this viscosity significantly. In fact, in some instances, the addition of lithium hydroxide reduces the viscosity.

The invention will be more readily understood from the following examples wherein a preferred embodiment is described.

*Example 1*

An aqueous kaolin slurry made from a secondary Georgia clay consists of 80% by weight of particles measuring under 2 microns and containing 71% clay solids, was mixed with 0.3% of a dispersing agent comprising sodium hexametaphosphate (sold on the market under the trade name "Calgon"). The pair of curves obtained with the Hercules viscometer on this material is indicated by the letter A in FIGURE 1 of the accompanying drawing. It will be noted that, as the speed (r.p.m.) or rate of shear increases, the torque increases until it flattens out at a certain critical value. This set of curves (A) is typical of a dilatant clay slurry. If the slurry had Newtonian flow characteristics on the other hand, it would give a straight line. A dilatant slurry, such as that whose properties are depicted by (A), would be extremely difficult to handle in many types of close-clearance pumps, and probably would stall such units. The pH of the slurry has not been observed to be critical, provided it is not lower than about 5.5, or higher than about 10.

*Example 2*

Another sample of the same clay slurry as that described in Example 1, containing the same type and amount of dispersing agent, was also treated with 0.05% (based on the weight of the clay) of lithium hydroxide in the form of a 50% aqueous suspension. The solids content was adjusted to 71% and readings again were taken on the Hercules viscosimeter and the data obtained are shown as the pair of curves (B) in FIGURE 1.

It will be noted from the speed versus torque curves (B), that the addition of lithium hydroxide changed significantly, at high shear, the flow characteristics of the kaolin slurry and made it practically non-dilatant in character, so that it can be pumped in units with close tolerances without danger of seizing.

*Example 3*

An aqueous kaolin slurry made from a primary English kaolin containing 66% clay solids was mixed with 0.25% of dispersing chemical (sold on the market under the trade name "Calgon"). The clay slurry was run on a Hagan high-shear viscometer and it exhibited a Newtonian viscosity of 9.6 poises at a $$\frac{dv}{dr}$$

(rate of shear in reciprocal seconds) of 864. After addition of 0.15% lithium hydroxide to the same slurry as described above, the slurry was run on the Hagan high-shear viscometer and the Newtonian viscosity was determined as 1.9 poises at a $$\frac{dv}{dr}$$

of 1,944. It will be noted that the high-shear vicosity was reduced by a factor of 5, even with the higher shear rate, by the addition of lithium hydroxide.

Although sodium hexametaphosphate has been described as the dispersing agent in the clay composition, other known dispersing agents may be employed, such as tetrasodium pyrophosphate, sodium tripolyphosphate, and other polyphosphates normally used in the kaolin industry. Other dispersants such as the lignosulfonates and silicates also can be used.

The term "dry clay" employed herein means a clay which has been dried to less than 1% moisture at 100° C. for 1 hour at 50% humidity. It must be emphasized that the moisture content of the clay is only important as far as determining accurately the percent solids of the slurry, and does not effect the results obtained by addition of lithium hydroxide.

I claim:

1. A clay composition in a form for use as a concentrated slurry having 50% to 72% solids and a pH of about 5.5 to 10.0, consisting essentially of a finely divided clay, a dispersing agent, and about 0.05% to about 0.2% by weight, based on the dry clay, of lithium hydroxide in a liquid medium, said hydroxide having the effect of reducing the slurry dilatancy of said clay at higher shear rates.

2. A clay composition in a form for use as a concentrated slurry having 50% to 72% solids and a pH of about 5.5 to 10.0, consisting essentially of a finely divided kaolin, a dispersing agent, and about 0.05% to about 0.2% by weight, based on the dry kaolin, of lithium hydroxide in a liquid medium, said hydroxide having the effect of reducing the slurry dilatancy of said clay at high shear rates.

3. A clay composition in a form for use as a concentrated slurry having 50% to 72% solids and a pH of about 5.5 to 10.0, consisting essentially of a finely divided kaolin, a dispersing agent, and about 0.05% to about 0.1% by weight, based on the dry kaolin, of lithium hydroxide in a liquid medium, said hydroxide having the effect of reducing the slurry dilatancy of said clay at high shear rates.

4. The process for producing a clay slurry of reduced dilatancy comprising slurrying in water a clay to at least a 60% and not over 72% clay solids content in presence of a dispersing agent, and then adding to the slurry about 0.05% to 0.2% by weight, based on the dry clay, of lithium hydroxide in the form of a liquid suspension, said slurry having a pH of about 5.5 to 10.0, and said hydroxide having the effect of reducing the dilatancy of said clay slurry at high shear rates.

5. A clay slurry of reduced dilatancy at high shear rates consisting essentially of a finely divided clay in concentration of about 50 to 72% by weight, a dispersing agent, and about 0.05% to 0.2% by weight, based on the dry clay, of lithium hydroxide in a liquid medium, said slurry having a pH of about 5.5 to 10.0.

References Cited in the file of this patent

UNITED STATES PATENTS

| | | |
|---|---|---|
| 1,398,014 | Fulton | Nov. 22, 1921 |
| 2,158,987 | Maloney | May 16, 1939 |
| 2,255,371 | Borger et al. | Sept. 9, 1941 |
| 2,440,601 | Dickerman | Apr. 27, 1948 |